(12) United States Patent
Shemesh et al.

(10) Patent No.: US 8,040,320 B2
(45) Date of Patent: Oct. 18, 2011

(54) INPUT DEVICE AND METHOD OF OPERATION THEREOF

(76) Inventors: Eldad Shemesh, Binymina (IL); Benny Batash, Moshav Netua (IL)

( * ) Notice: Subject to any disclaimer, the term of this patent is extended or adjusted under 35 U.S.C. 154(b) by 562 days.

(21) Appl. No.: 12/289,836

(22) Filed: Nov. 5, 2008

(65) Prior Publication Data

US 2009/0115725 A1  May 7, 2009

Related U.S. Application Data

(60) Provisional application No. 60/996,166, filed on Nov. 5, 2007.

(51) Int. Cl.
*G06F 3/033* (2006.01)

(52) U.S. Cl. ......... 345/158; 345/162; 345/170; 345/179

(58) Field of Classification Search ................. None
See application file for complete search history.

(56) References Cited

U.S. PATENT DOCUMENTS

| 6,118,435 | A | 9/2000 | Fujita et al. |
| 6,760,009 | B2 | 7/2004 | Omura et al. |
| 7,009,594 | B2 | 3/2006 | Wang et al. |
| 7,903,166 | B2 * | 3/2011 | Daly .............................. 345/672 |
| 2006/0028457 | A1 * | 2/2006 | Burns ........................... 345/179 |
| 2008/0025612 | A1 * | 1/2008 | Wang et al. .................. 382/188 |

* cited by examiner

*Primary Examiner* — Muhammad N Edun
(74) *Attorney, Agent, or Firm* — The Nath Law Group; Susanne M. Hopkins; William L. Klima

(57) ABSTRACT

A generic input device built of Electro-optical camera, sensors, buttons and communication means, provides a measure for operating in absolute and/or relational mode, most software applications on many electronic platforms with display independent of the screen characters.

7 Claims, 4 Drawing Sheets

SmarTouch – Stylus mechanical diagram

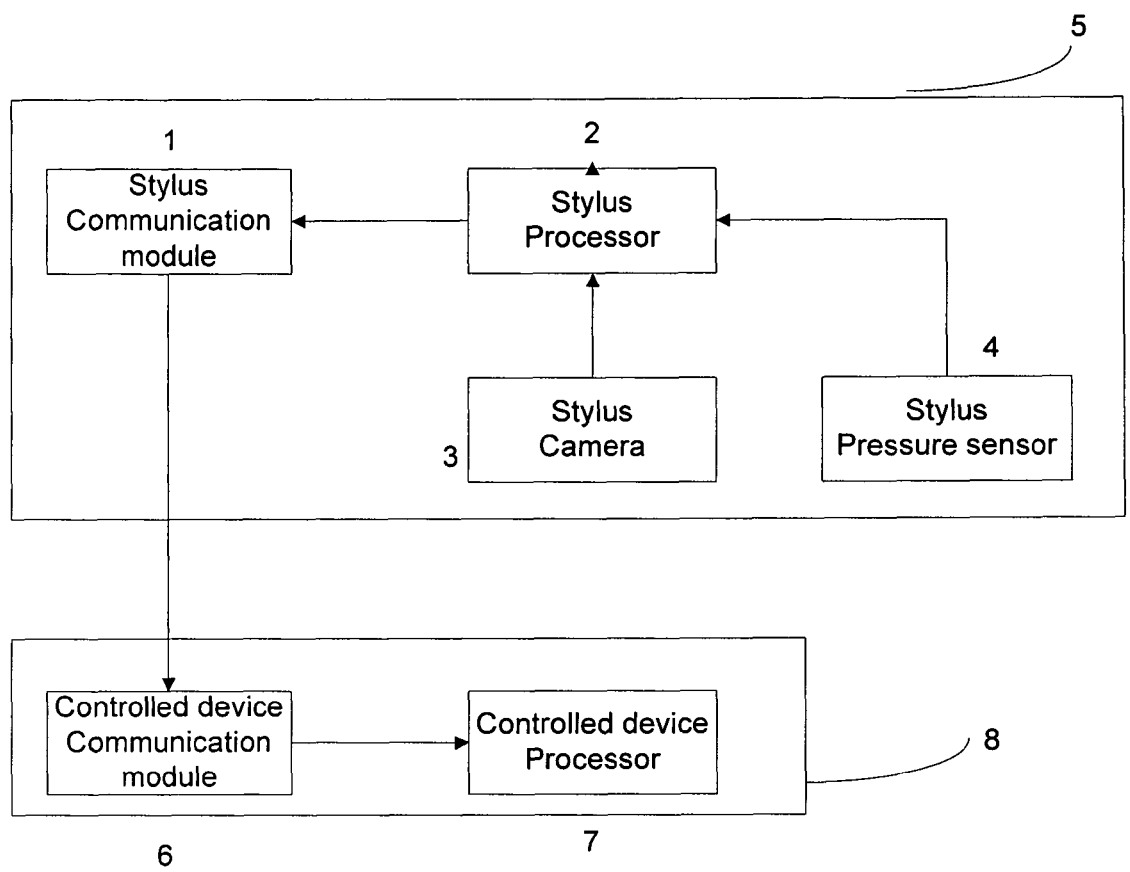
SmarTouch – Figure 1 - functional block diagram

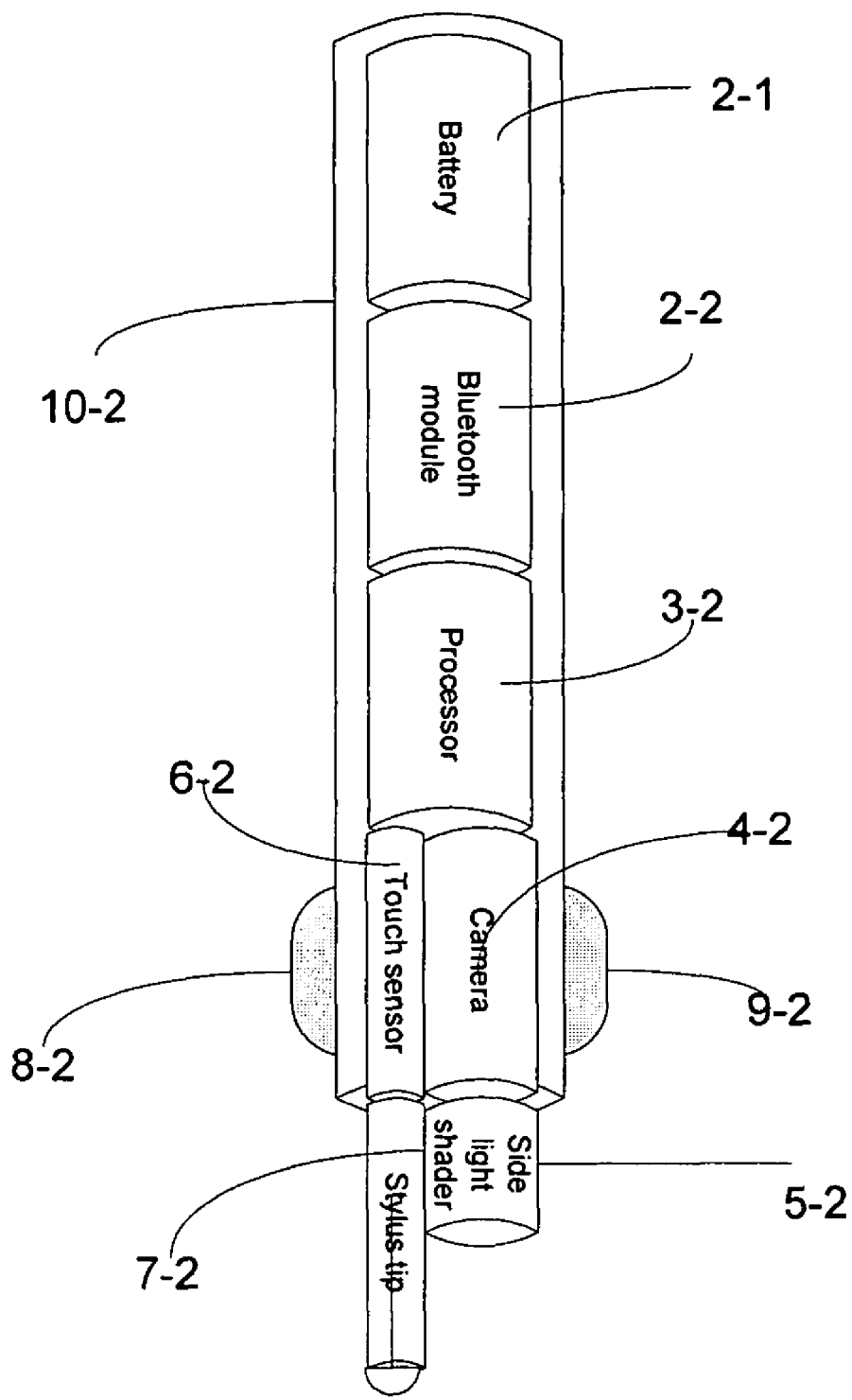
SmarTouch – Figure 2 - Stylus mechanical diagram

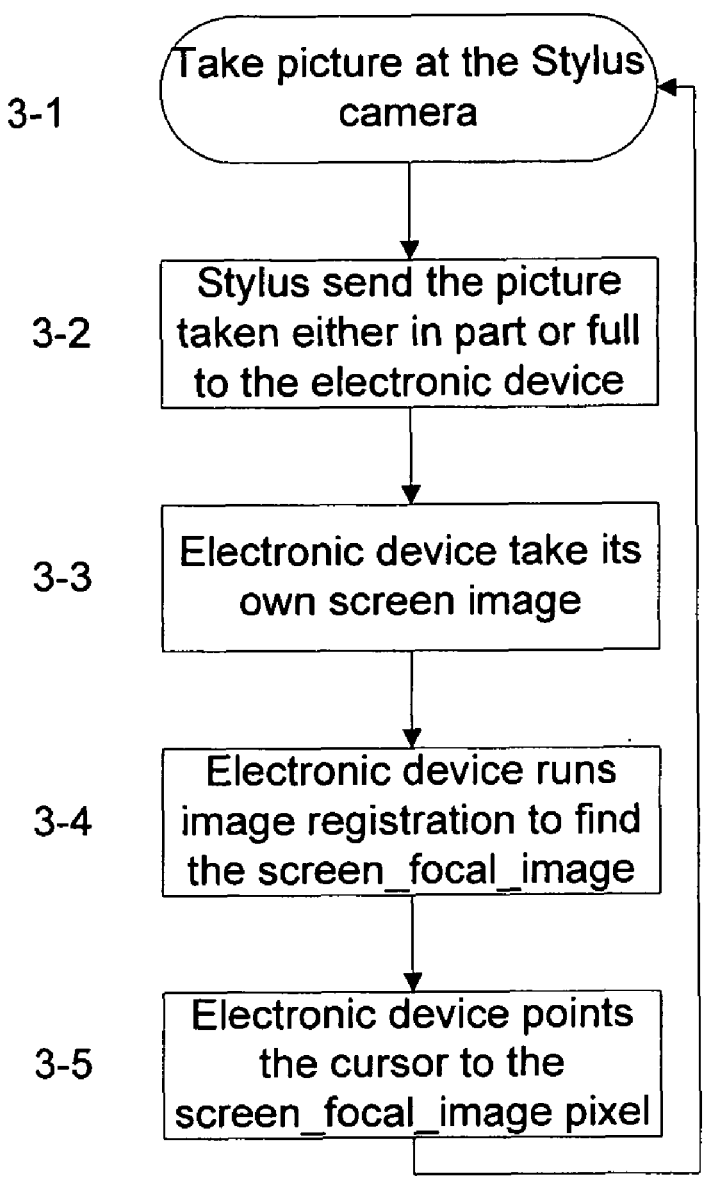
SmarTouch – Figure 3 - Generalized operating flow
3-1 Take picture at the Stylus camera
3-2 Stylus send the picture taken either in part or full to the electronic device
3-3 Electronic device take its own screen image
3-4 Electronic device runs image registration to find the screen_focal_image
3-5 Electronic device points the cursor to the screen_focal_image pixel

SmarTouch – Figure 4 - Generalized flow chart 2
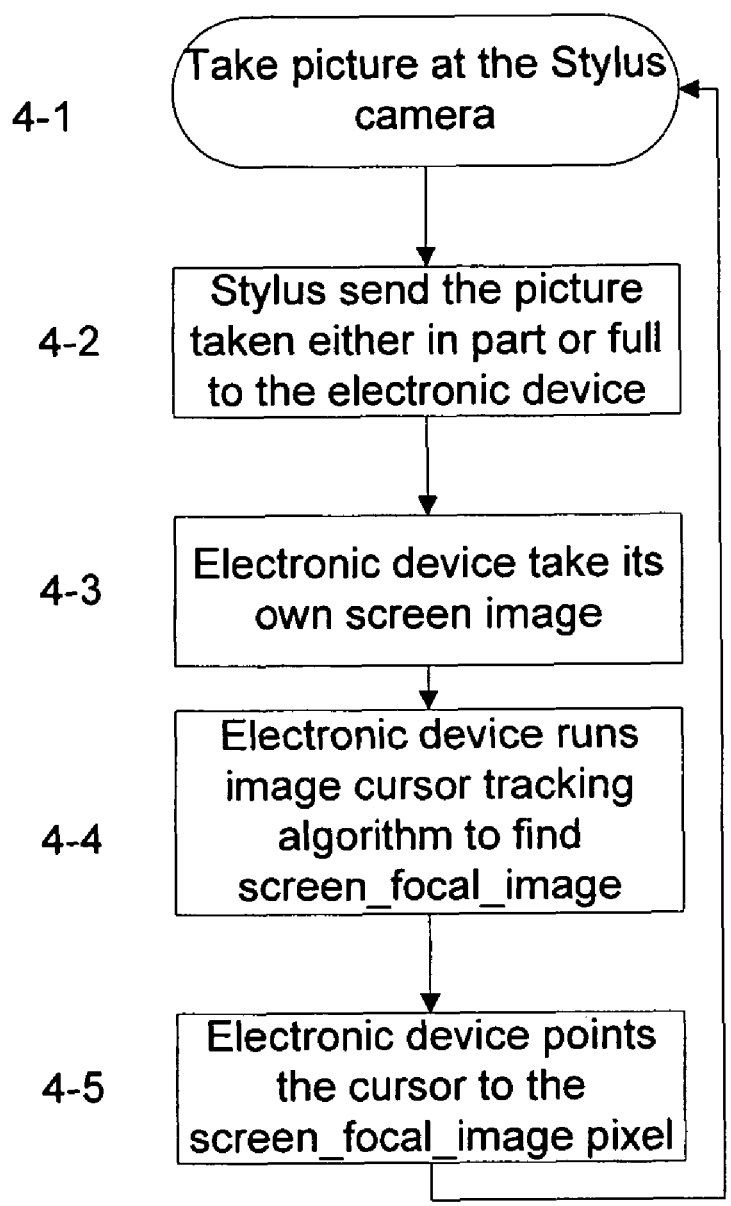
4-1 Take picture at the Stylus camera
4-2 Stylus send the picture taken either in part or full to the electronic device
4-3 Electronic device take its own screen image
4-4 Electronic device runs image cursor tracking algorithm to find screen_focal_image
4-5 Electronic device points the cursor to the screen_focal_image pixel

INPUT DEVICE AND METHOD OF OPERATION THEREOF

CROSS REFERENCE TO RELATED APPLICATIONS

This application claims the benefit of U.S. provisional application 60/996,166 filed on Nov. 5, 2007, which is hereby incorporated by reference herein.

FIELD OF THE INVENTION

The present invention related to a method and device for feeding inputs to electronic platforms with displays.

BACKGROUND OF THE INVENTION

We are operating in our daily use, large number of electronic platforms that need to be fed with inputs.

Among these electronic devices with displays, we have desktop computers, laptops, TabletPCs, PocketPCs, televisions, cellular phones and the like.

In order to operate/interact with the above devices, a large number of input devices have been invented. Among these devices we have the mouse, trackball, keyboards, remote controllers, active and passive styluses that interact with the screen without having to touch it, resistive screens that need to be touched in order to get the inputs, sensors outside the screen to detect the move of an input device like a stylus, styluses that detect electro-optical wise a pattern imprinted in the screen or on the background of the displayed information etc.

The above input devices can be partitioned in several ways, the first is the partition between absolute and relational devices.

The absolute devices work on the screen itself and include the styluses (active, passive), resistive screen, imprinted pattern and the ones that are being inspected by other outside sensors.

The relational input devices where each movement is relative to the current position and not an absolute position includes the mouse, trackball, keyboard, part of the remote controllers (navigation in equipment menu) etc.

The above input devices can be further partitioned into two other major groups, the first, is the group which doesn't interact directly with the screen and includes the mouse, trackball, keyboard and the remote controller. The second is the group that directly interacts with the screen and is further partitioned into three subgroups:

1. The first subgroup is the one that has built into the screen sensors/elements and includes devices like the passive and active stylus and the resistive screens. For example, such type of devices is disclosed in U.S. Pat. No. 6,118,435 (Fujita, et al.). The patent discloses A display unit with touch panel includes a press detection switch for detecting a press on a touch panel at a pressure exceeding a predetermined level so as to output a press detection signal, a driving-signal generating circuit responding to the press detection signal to generate a driving signal, a driving portion actuated by the driving signal to drive the touch panel into displacement thereby providing an operator with a tactile feedback, and an AND circuit for outputting an AND signal upon receipt of both of a coincidence detection signal from a coincidence detecting circuit and the press detection signal from the press detecting switch, and a gate circuit for inhibiting a passage of the operated-position signal from the operated-position detecting circuit when the AND signal from the AND circuit is not supplied and permitting the passage of the operated-position signal when the AND signal from the AND circuit is supplied. The display unit with touch panel ensures the prevention of operation errors caused by the operator merely sliding his finger on the touch panel or accidentally touching the touch panel.

2. The second subgroup is the one where outside sensors inspect the movement of the input device and includes sensors like cameras and ultrasonic sensors. Such device is disclose in U.S. Pat. No. 6,760,009 (Omura, et al.) where, the coordinate-position inputting/detecting device comprises a lighting device for emitting light into an entry area into which an arbitrary pointing body is inserted to perform an entry operation. At least two image pickup devices are provided with a pre-specified space therebetween on a peripheral section of the entry area for picking up images of the pointing body illuminated by the light from the lighting device. Position on the CCD of the image pickup devices where an image of the pointing body is formed is obtained according to output from each of the image pickup devices. Coordinates of the position of the pointing body in the entry area are calculated from these positions.

3. The third subgroup is the one that calculate the input device location by interpreting a pattern imprinted into the screen. This type is sometimes being augmented with other sensors like gyroscopes and accelerometers. U.S. Pat. No. 7,009,594 (Wang, et al.) describes a universal input device. The universal input device provides a common user interface for a variety of different computing platforms including printed documents. Using the present system, one may use the universal input device to control various computing devices as well as capture handwritten electronic ink and have the electronic in be associated with new or stored documents. The technology is based on an imprinted in the screen pattern that can be inspected with UV camera.

SUMMARY OF THE INVENTION

In accordance with certain aspects of the present invention, there is provided a system capable to generate and input data representative of a desired position on a display of an electronic platform and comprising an input device and a positioning processor. The input device comprises a camera configured to obtain a part of an image displayed at the display of the electronic platform, said part representative of a desired position on a display thus giving rise to a stylus image; a processor operatively coupled to the camera and configured to receive one or more said stylus images, to provide necessary processing and to accommodate the stylus images and/or derivatives thereof; communication means operatively coupled to the processor and configured to receive at least one stylus image or derivatives thereof from the processor and to transfer to the positioning processor the stylus image and/or derivatives thereof representative of desired position on the display. The positioning processor is configured to obtain a full image of the display, to extract data representative of a desired position by comparing the full image and/or derivatives thereof with the received stylus image and/or derivatives thereof. Said extracted data and/or derivatives thereof are provided to the electronic platform to be used as instructions related to positioning the cursor at the desired position.

In accordance with further aspects of the present invention, the positioning processor may be further configured to extract from the received stylus image and/or derivatives thereof data representative of a deviation between an actual cursor position and a center of the stylus image, and to provide said data and/or derivatives thereof to the input device; and the input device may be further configured to obtain, based on said received data, an adapted stylus image with no said deviation, said adapted imaged to be send to the positioning processor for comparing with the full image of the display and extracting data representative of a desired position.

The input device is configured to operate in an active form, e.g. to actively measure signals and to facilitate generating data indicative of positioning and/or movement of the input device using sensors (e.g. camera) incorporated within the input device.

In accordance with further aspects of the present invention, the positioning processor constitutes a part of the processor of the input device and/or a part of the electronic platform.

In accordance with other aspects of the present invention, there is provided a method of inputting data representative of a desired position on a display of an electronic platform. The method comprises:

obtaining by an input device a part of an image displayed at the display of the electronic platform, said part representative of a desired position on a display thus giving rise to a stylus image;

transferring from the input device to the positioning processor the stylus image and/or derivatives thereof representative of desired position on the display;

obtaining a full image of the display;

extracting data representative of a desired position by processing and comparing the full image of the display with the stylus; and providing said extracted data and/or derivatives thereof as one or more instructions to the electronic platform.

In accordance with further aspects of the present invention, the method may further comprise extracting from the stylus image and/or derivatives thereof data representative of a deviation between an actual cursor position and a center of the stylus image; providing said data and/or derivatives thereof to the input device; and obtaining by the input device, based on said received data, an adapted stylus image with no said deviation, wherein extracting data representative of a desired position is provided by comparing the full image of the display with said adapted imaged.

In certain embodiments of the invention the data representative of a desired position may be extracted from the above deviation only, with no need in comparing the stylus image with the full image.

In accordance with further aspects of the present invention, the processing may be provided by the electronic platform and/or the input device and/or a separate processing unit, for example, by a USB dongle attached to the electronic platform.

Among advantages of certain embodiment of the present invention are the following:

1. No need for large space for screen interaction.
2. No special hardware in the screen is needed
3. Power consumption will be reduced in the electronic platform
4. Price of the electronic platform will fall down
5. Operation of the screen can be in much larger distances than today
6. No need for manufacturing changes in most devices
7. Support both the relational and absolute modes and combinations thereof.

BRIEF DESCRIPTION OF THE DRAWINGS

In order to understand the invention and to see how it may be carried out in practice, certain embodiments will now be described, by way of non-limiting example only, with reference to the accompanying drawings, in which:

FIG. 1 illustrates detailed functional block diagram of the input device in accordance with certain embodiments of the present invention.

FIG. 2 illustrates a generalized mechanical block diagram of the input device in accordance with certain embodiments of the present invention.

FIG. 3 illustrates a generalized flow chart of the input device operating in accordance with certain embodiments of the present invention.

FIG. 4 illustrates a generalized flow chart of the input device operating in accordance with certain embodiments of the present invention.

DETAILED DESCRIPTION OF EXEMPLARY EMBODIMENT

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and description, identical reference numerals indicate those components that are common to different embodiments or configurations.

Unless specifically stated otherwise, as apparent from the following discussions, it is appreciated that throughout the specification discussions utilizing terms such as ™"processing", "computing", "calculating", "determining", "generating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, Disk-on-Key, smart cards (e.g. SIM, chip cards, etc.), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions capable of being conveyed via a computer system bus.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The references cited in the background teach many principles of implementation and operation of input devices that are applicable to the present invention. Therefore the full contents of these publications are incorporated by reference herein where appropriate, for appropriate teachings of additional or alternative details, features and/or technical background.

The device is built of a camera, processor, and communication means and might be supported with other sensors such as accelerometers, gyroscopes, pressure sensors, magnetic sensors and others.

Communication means have been incorporated to allow bidirectional communication between the controlled electronic device and the input device.

Software and in some cases hardware package has to be installed in the electronic platform.

The input device which is a stylus in the preferred embodiment might have several buttons to allow for functionalities like click, double click, shifting from absolute to relational modes and vice versa, turning the device on and off and others.

Controlling of the electronic platform is done by several actions. The first action is positioning the cursor in the right place which is the location the input device is aiming at. All the other actions are based on cursor positions, these includes click, double click, drag-and-drop, writing on the screen etc.

FIG. 1 illustrates detailed functional block diagram of the input device. The FIG. 1 also illustrates operative connections with the relevant parts of the electronic platform where image registration is done in the electronic platform.

The stylus communication module 1, receives all the data/commands from the CPU and transmit it to the electronic platform. The above data information includes the captured images or part of them in the needed format and the commands issued by the different buttons.

The communication module can be used as a user unique identifier as each Bluetooth module has its own unique identifier that can be associated with user ID, name or other personal parameter.

The stylus processor 2, comprises memory and controls the entire stylus processing including the receiving the stylus camera images, applying the needed processing such as image processing and compression, and sending the processed image to the electronic platform for further processing. Receiving all the button presses and translating them into commands sent to the electronic platform as mouse clicks, this will include commands such as left_button_down, left_button_up, right button_down, right button_up etc. In addition, the processor will read the pressure sensor outputs and will decide upon these readings whether the tip of the stylus touched the screen or not. In case it decides that the tip touches the screen, it will send the left_button_down message.

In other embodiments, the cursor location calculation is done at the stylus. In this case, the stylus receives the screen image and applies the same processing handled by the electronic platform described above. This processing includes image registration or cursor tracking or both.

The stylus camera 3, will be color camera in the preferred embodiment and will include in the preferred embodiment an fast auto focus capability that will enable the collection of focused images at all distance. The images collected at rates from 10 s of hertz to over a hundred hertz. Image resolution should in the preferred embodiment be over 240×240 pixels.

The images will be sent to the processor for processing and transmission to the electronic platform.

The stylus pressure sensor 4, will sense the pressure on the tip of the stylus and will send it to the processor for determining whether the tip touches the screen or not. This component is an optional one and is needed for improving the device performance reliability.

Electronic platform Communication 5, will receive all the information from the stylus communication module and will forward it to the electronic platform processor.

Electronic platform processor 6, will receive the image data through the communication module, will provide processing further detailed with reference to FIG. 3 and according to its output will point the cursor to the right place. In addition, it will forward button commands such as Left_Click_Down to the operating system or specific application.

Those skilled in the art will readily appreciate that the invention is not bound by the configuration of FIG. 1; equivalent and/or modified functionality may be consolidated or divided in another manner and may be implemented in any combination of software, firmware and hardware. For example, in certain embodiments of the invention all processing necessary for cursor positioning may be provided by the stylus processor 2.

FIG. 2 is a generalized mechanical block diagram of the input device, which in the preferred embodiment has a stylus shape.

The battery 2-1 provides energy needed for the device operation. In the preferred embodiment this battery is a rechargeable one. The stylus has to be placed in a cradle for the battery to be recharged. In another embodiment this battery will be coupled with self-charging device that prevent the need of using a cradle. The battery is located at the top of the stylus such that when the stylus place inverted in the cradle, it will be in connection with the recharging module.

The communication module 2-2 which is Bluetooth in the preferred embodiment will be located in blow to the battery such that its transmission will not be obstructed by the human hand that holds it.

The processor 3-2 will be located in the middle of the stylus to prevent long wiring The camera 4-2 will be located at the lower end of the stylus such that no part of the stylus beside the stylus tip will be in its field of view. The camera will be protected from side light by a cylinder shape protector.

The camera side light blocker 5-2 was designed such that will prevent form side light that was not initiated by the screen to lower the image quality.

The touch sensor 6-2 was located just on the back of the stylus tip such that it'll be able to measure every touch of the stylus in the screen The stylus tip 7-2 is connected to the touch sensor to convey the pressure the user is applying on the screen. The shape of it might be such that it'll be part of the side light blocker. The stylus tip length was designed such that will allow the focus of the camera even in very close distances from the screen where the tip touches the screen.

The stylus buttons 8-2,9-2 will include the left and right mouse buttons, the power On/Off button and a one more programmable buttons. In this embodiment we added only the right and left mouse lime buttons.

The stylus frame 10-2, will have the shape such that it'll be able to accommodate all the 1 to 9 components and allow the camera to work with the needed light. The shape allows the stylus tip transfer of pressure to the pressure sensor and at the same time to allow free view for the camera.

FIG. 3 is a generalized flow chart of an input device operation in accordance with certain embodiments of the present invention.

In certain embodiment of the invention the positioning of the cursor is provided in an absolute mode wherein the analysis processing takes place in the electronic platform as illustrated with reference to FIG. 3:

1. The input device takes a picture called stylus_image that obtains a part or the entire screen of the electronic platform. The stylus_image center pixel which is the pixel stands half way in width and height of the whole image is called the focal-pixel and designates the point on the electronic platform screen the stylus is pointing at.
2. The stylus sends part or full stylus_image to the electronic platform. The part of the stylus image to be sent is the smallest possible needed for good registration. This will be set as a parameter of the stylus operation.
3. The electronic platform process, upon receiving the stylus_image, gets the local screen image called screen_image.
4. When the two images are available, the registration process will commence. During this process which takes into account image distortions such as scaling, rotation, affine etc. each pixel in one picture is matched with the right pixel in the second picture.
5. When registration is done, the focal-pixel in the stylus-image has its match in the screen-image, this pixel is called screen-focal-pixel
6. The processor will position the cursor in the screen-focal-pixel position.
7. Go back to step 1 (receive one more image from the stylus).

In certain alternative embodiments of the invention, the positioning of the cursor in absolute mode is provided with the analysis processing taking place in the Input device as, for example, presented below:

1. The electronic platform build an image called screen-image that contains the last screen frame presented on the screen. This process will happen at the most needed frequency but in the preferred embodiment will happen each and every frame.
2. The stylus obtains a full screen image or part thereof from the electronic platform. The part of the stylus image to be obtained is the smallest possible needed for good registration. This will be set as a parameter of the stylus operation.
3. The stylus process, upon receiving the screen_image, takes a picture from its camera, this picture taken called stylus_image. The center of this picture is called the focal-pixel and it defines the point the stylus camera is looking at.
4. When the two images are available, the registration process will commence. During this process which takes into account image distortions such as scaling, rotation, affine etc. each pixel in one picture is matched with the right pixel in the second picture. In other embodiment, the cursor tracking algorithm will be employed which calculate the difference between the cursor current location and the location the camera is pointing at by the different parameters such as cursor orientation and size and by that find the point the cursor should be moved to.
5. When registration is done, the focal-pixel in the stylus-image has its match in the screen-image, this pixel is called screen-focal-pixel
6. The stylus will send the screen-focal-pixel location to the electronic platform.
7. The electronic platform processor will position the cursor in the screen-focal-pixel position.
8. Go back to step 1 (receive one more image from the electronic platform. Each of new image is generated as new screen frame is ready).

Collecting of message from the input device is done in through all the time the stylus if working and with a communication distance from the electronic platform. In case the message received is an image message, the electronic platform process, register received stylus image with its current screen image. The output of the registration process is a state where each pixel in one picture is matched with the right pixel in the second picture.

The point on the screen, the stylus camera is pointing at is the pixel in the center of this image and is called focus pixel. The process in the electronic platform takes the focus pixel and finds its match in the screen image. The cursor is moved to the focus pixel. When this process ends, the routine awaits new message from the electronic platform.

When the received message is a command message, the message is going through processes that either sends them to the registration process if it's information that the registration process needs or in case of buttons pressed sends them to the operating system.

The above algorithms describe only the location pointing part, after synchronization has took place, all the other buttons (such as click, double click etc.) can be used flawlessly. We have to bear in mind that click action happens either when the stylus touches the screen or when the "Click" button is pressed at the input device.

In relational mode, the captured image in the input device (with distance sensor in some cases) is the only input to the algorithms.

FIG. 4 is a generalized flow chart of an input device operation in accordance with certain embodiments of the present invention.

In certain embodiment of the invention the positioning of the cursor is provided in an absolute mode wherein the processing either in the input device or in the electronic platform and includes the processing called cursor tracking. In the following is a description of the flow associated with such processing when the assumption is that the positioning process has already synchronized with the cursor and the image taken includes the cursor:

4-1 the stylus take a new picture that includes the cursor old position.
4-2 The stylus sends the taken picture to the electronic platform.
4-3 The electronic device sends the screen image to the position process
4-4 The positioning processor within the electronic platform receive the picture and by image processing finds the distance from the cursor location to the picture central pixel, this is done in various ways, one of the commonest ways is suing the cursor known size and orientation. The output of this process is the new pixel on the screen that designates the focus of the stylus camera and is called screen_focal_image pixel.
4-5 The position processing send the new cursor position defined by screen_focal_image to the operating system or the specific application that runs at that moment and await a new picture from the input device.

In order to give a better understanding of the communication and algorithm complexity, the following example is presented:

Human hand will not move more than 90 degrees in half a second. In the case of 60 Hz refresh rate this hand movement translates into 1.5 degrees per frame. If the hand is very close to the screen e.g. 10 centimeter which is the case were the pen image center is moving in the highest speed, the distance on the screen for each frame will be 0.26 centimeter which in a 14.1" screen translates into not more than 10 pixels. If the radius is 10 pixels than the subframe needed for transferring is not more than 20×20 pixels in size. The total pixels needed in one second are 400×60 or 24,000 and in the case of 16 bit per pixel it translates into 384,000 bit per second which is doable in most of the communication protocols known today. In addition the registration algorithm will easily accommodate the task of registration of small picture (20×20 pixels) with bigger one (the screen image).

The following numbered paragraphs define some preferred embodiments of the invention:

1. A device according to the present invention comprising of a camera, communication means and the option of having additional supporting sensors to function as a standalone generic input device for any electronic platform with a display or being attached to a display in absolute location or relational modes without incorporating any hardware changes in the electronic platforms screens or adding sensors attached to the screens or adding any location information to the image and where pointing location at the screen is done via image registration of input device image and the screen image and/or cursor tracking applied on the input device image.
2. A device according to embodiment of 1 where the device shape is a stylus shape or a thimble that can be ware on the tip of a user fingers.
3. A device according to embodiment 1 where the camera is of various types such as black and white, color, UV etc.
4. A device according to the embodiment 1 where the camera means two or more cameras from different types such as black and white camera and color camera.
5. A device according to embodiment 1 where the camera is bounded by walls that prevents the light that arrives from the sides to obstruct capturing of high quality screen image.
6. A device according to embodiment 1 where communication means is any wireless (such as Bluetooth, WiFi, Zigbee etc) communication.
7. A device according to embodiment 1 where communication means is any wired communication as rs232, USB etc.
8. A device according to embodiment 1 where communication protocol is the same as wireless mouse.
9. A device according to embodiment 1 where supporting sensors are inertial sensors, touch sensors, distance sensors etc.
10. A device according to embodiment 1 where standalone means that the input device doesn't need any other sensors or hardware change in the electronic platform.
11. A device according to embodiment 1 where generic means that it will function the needed way with all type of electronic platforms that have a screen or attached to a screen or projector from any type.
12. A device according to embodiment 1 where the electronic platform is a television set.
13. A device according to embodiment 1 where the electronic platform is an existing television set with added hardware for image registration and communication protocol needed to interact with the input device.
14. A device according to embodiment 1 where the processing can take place in the input device or in the electronic platform.
15. A device according to embodiment 1 where the input device can work in wither absolute or relational modes
16. A device according to embodiment 1 where the display can be an LCD display, CRT display, projector, TV screen etc.
17. A device according to embodiment 1 where standalone means that no electromagnetic interaction is being done between the device and the platform's screen
18. A device according to embodiment 1 where standalone means that it doesn't need any imprinted scheme of any sort on the screen it operate on.
19. A device according to embodiment 1 where hardware changes means, location information embedded in the screen or image in a way of being imprinted or printed or hidden in the background of the screen etc.
20. A device according to embodiment 1 where sensors attach to the screens or part of it includes optical, ultrasonic sensors etc.
21. A device according to embodiment 1 where image registration can take place either at the input device or at the electronic platform.
22. A device according to embodiment 1 where the user signature is being used as a password for unlocking the input device.
23. A device according to embodiment 1 where the device's one or more hardware component such as Bluetooth address is being used as the device unique identifier.
24. A device according to embodiment 1 where the platform can be paired with the device to prevent from other devices to interfere with the platform operation.
25. A device according to embodiment 1 where one input device or more can feed the same platform simultaneously.
26. A device according to embodiment 1 where the battery is movement rechargeable or can be recharged by a cradle.
27. A device according to embodiment 1 where the device works with the platform in a distance that is limited by the communication distance only.
28. A method according to embodiment 1 where the positioning is done by cursor tracking only
29. A method according to embodiment 1 where positioning is done by image registration only
30. A method according to embodiment 1 where positioning is done by image registration and cursor tracking
31. A method according to embodiment 1 where initial cursor positioning is done by positioning the stylus in a certain proximity to the screen
32. A method according to embodiment 1 where initial cursor positioning is done by adding a synchronization frame in the electronic platform
33. A method according to embodiment 1 where input device location is found by trigonometric calculation that takes into account cursor location, size and orientation Those skilled in the art will readily appreciate that various modifications and changes can be applied to the embodiments of the invention as hereinbefore described without departing from its scope, defined in and by the appended claims.

The invention claimed is:
1. A system capable to generate and input data representative of a desired position on a display of an electronic platform and comprising an input device and a positioning processor, a) the input device comprises:
  i) a camera configured to obtain a part of an image displayed at the display of the electronic platform, said part representative of a desired position on a display thus giving rise to a stylus image;
  ii) a processor operatively coupled to the camera and configured to receive one or more said stylus images and accommodate the stylus images and/or derivatives thereof resulting from a processing by the processor;
  iii) communication means operatively coupled to the processor and configured to receive from the processor and to transfer to the positioning processor at least one stylus image and/or derivatives thereof representative of desired position on the display;
b) the positioning processor is configured to obtain a full image of the display, to extract data representative of a desired position by comparing the full image and/or derivatives thereof with the received stylus image and/or derivatives thereof, and to provide said extracted data and/or derivatives thereof as one or more instructions to the electronic platform.

2. The system of claim 1 wherein:
a) the positioning processor is further configured to extract from the received stylus image and/or derivatives thereof data representative of a deviation between an actual cursor position and a center of the stylus image, and to provide said data and/or derivatives thereof to the input device; and
b) the input device is further configured to obtain, based on said received data, an adapted stylus image with no said deviation, said adapted imaged to be send to the positioning processor for comparing with the full image of the display and extracting data representative of a desired position.

3. The system of claim 1 wherein the positioning processor constitutes a part of the processor of the input device.

4. The system of claim 1 wherein the positioning processor constitutes a part of the electronic platform.

5. A method of inputting data representative of a desired position on a display of an electronic platform, the method comprising:
a) obtaining by an input device a part of an image displayed at the display of the electronic platform, said part representative of a desired position on a display thus giving rise to a stylus image;
b) obtaining a full image of the display;
c) extracting data representative of a desired position by processing and comparing the full image of the display with the stylus image and/or derivatives thereof; and
d) providing said extracted data and/or derivatives thereof as one or more instructions to the electronic platform.

6. The method of claim 5 wherein said data extracting is provided by the electronic platform.

7. The method of claim 5 further comprising:
a) extracting from the stylus image and/or derivatives thereof data representative of a deviation between an actual cursor position and a center of the stylus image;
b) providing said data and/or derivatives thereof to the input device; and
c) obtaining by the input device, based on said received data, an adapted stylus image with no said deviation, wherein extracting data representative of a desired position is provided by comparing the full image of the display with said adapted imaged.

* * * * *